United States Patent

Nalbandyan et al.

[11] Patent Number: 4,816,697
[45] Date of Patent: Mar. 28, 1989

[54] PORTABLE HYDROELECTRIC POWER UNIT

[76] Inventors: Nikolaes A. Nalbandyan; Grigor A. Nalbandyan; Harutyun G. Nalbandyan, all 4421 Melbourne #5, Los Angeles, Calif. 90027

[21] Appl. No.: 11,305
[22] Filed: Feb. 5, 1987
[51] Int. Cl.⁴ .................................................. F03B 3/04
[52] U.S. Cl. .......................................... 290/54; 290/43
[58] Field of Search ............... 290/43, 52, 54, 1 C; 415/2 A, 72, 73; 416/189, 198 R, DIG. 4

[56] References Cited

U.S. PATENT DOCUMENTS

| | | | |
|---|---|---|---|
| 2,929,937 | 3/1960 | Kroger | 290/52 |
| 4,218,175 | 8/1980 | Carpenter | 415/2 A |
| 4,227,092 | 10/1980 | Campagnuolo et al. | 290/1 C |
| 4,258,271 | 3/1981 | Chappell et al. | 290/54 |
| 4,324,984 | 4/1982 | Borgren | 290/54 |
| 4,392,063 | 7/1983 | Lindquist | 290/54 |
| 4,524,285 | 6/1985 | Rauch | 290/54 X |
| 4,600,360 | 7/1986 | Quarterman | 415/2 A |

Primary Examiner—William M. Shoop, Jr.
Assistant Examiner—W. E. Duncanson, Jr.
Attorney, Agent, or Firm—Ladas & Parry

[57] ABSTRACT

The present apparatus is a hydroelectric power device for generating energy from currents of water. It includes a blade spiraling about a spindle or shaft which is connected to a generator. The rotation of the blade and shaft is converted by the generator into energy.

19 Claims, 6 Drawing Sheets

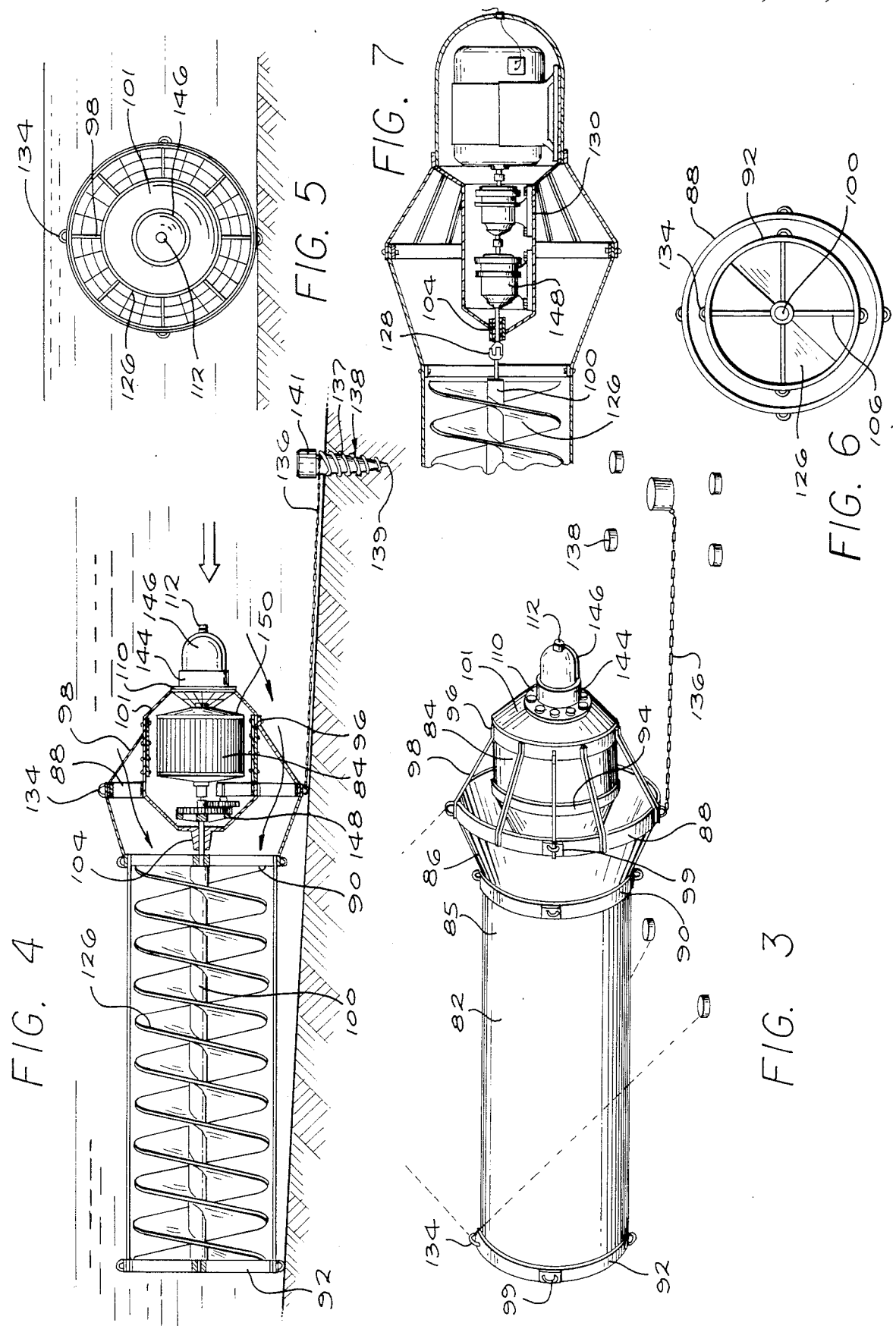

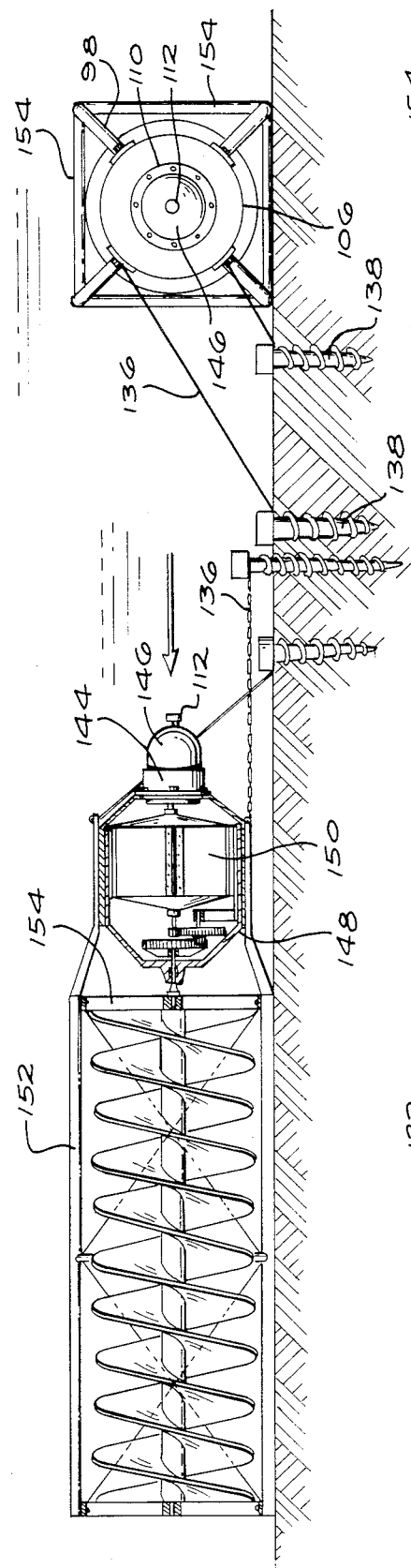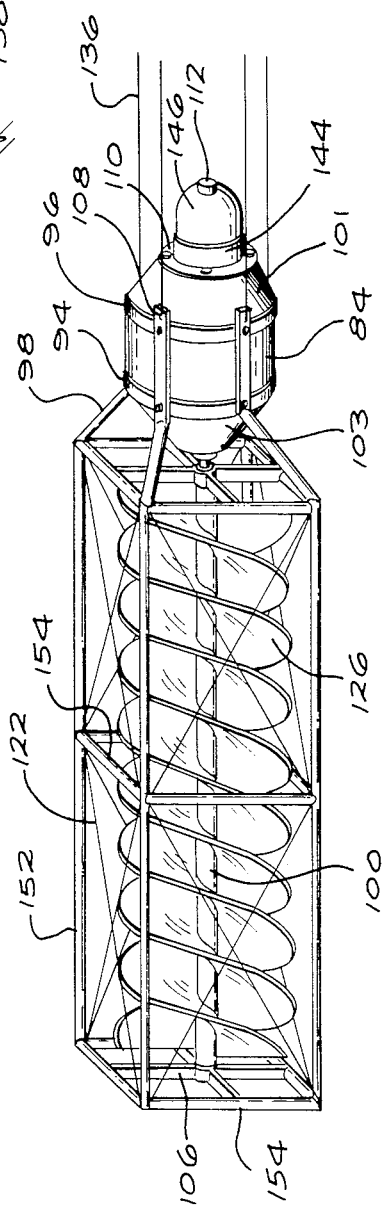

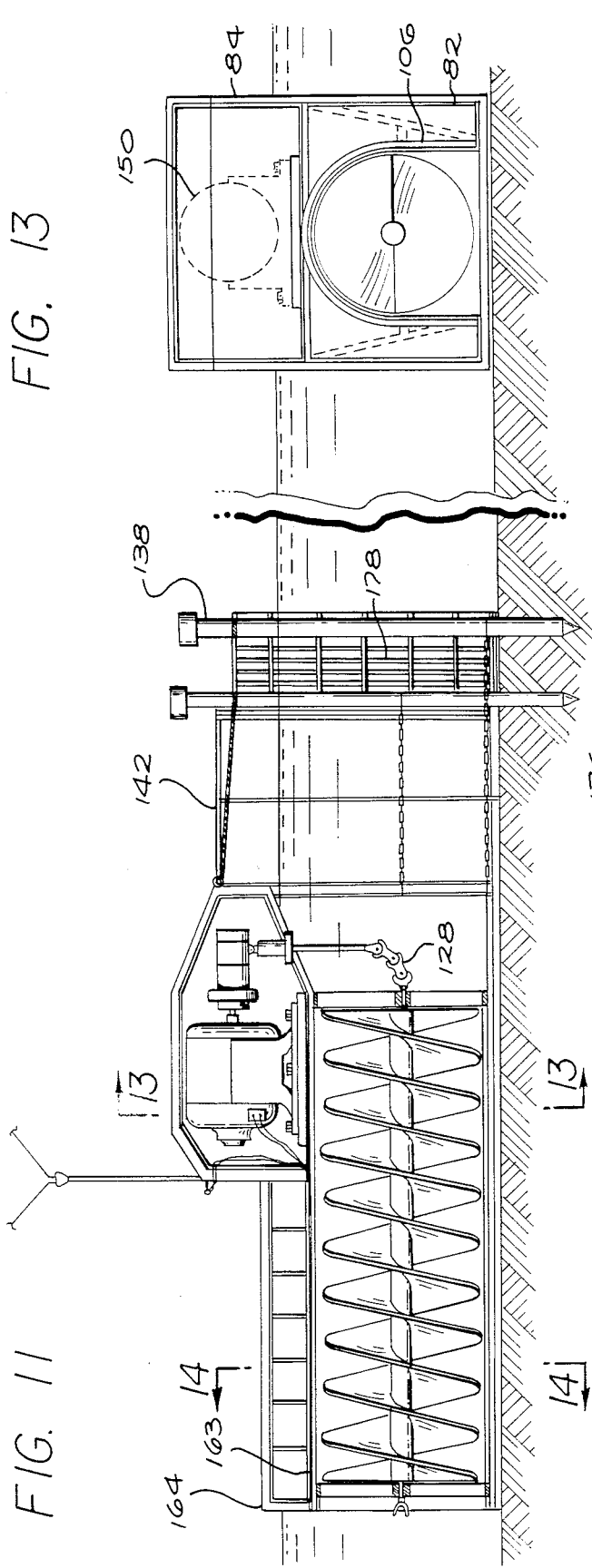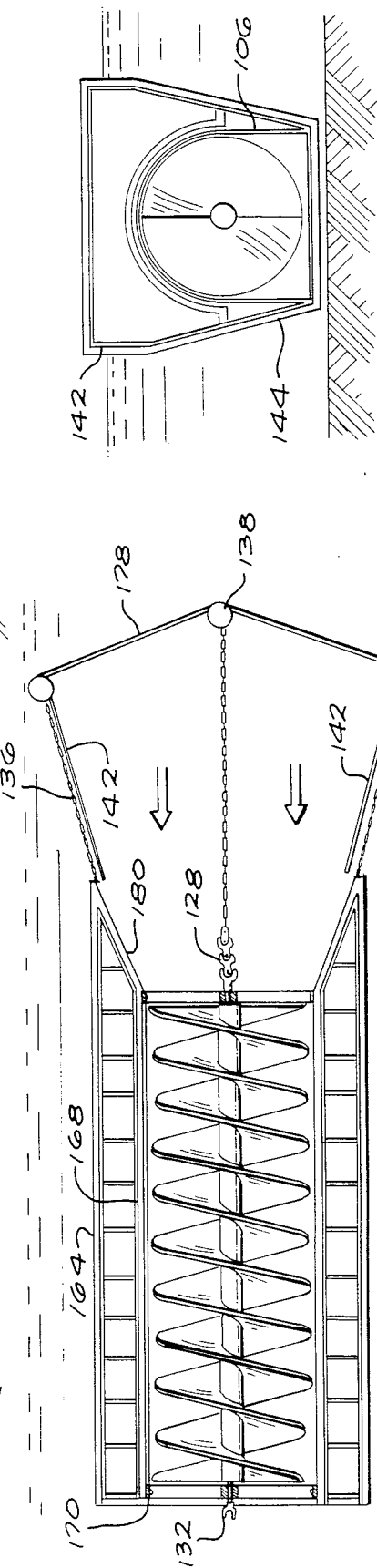

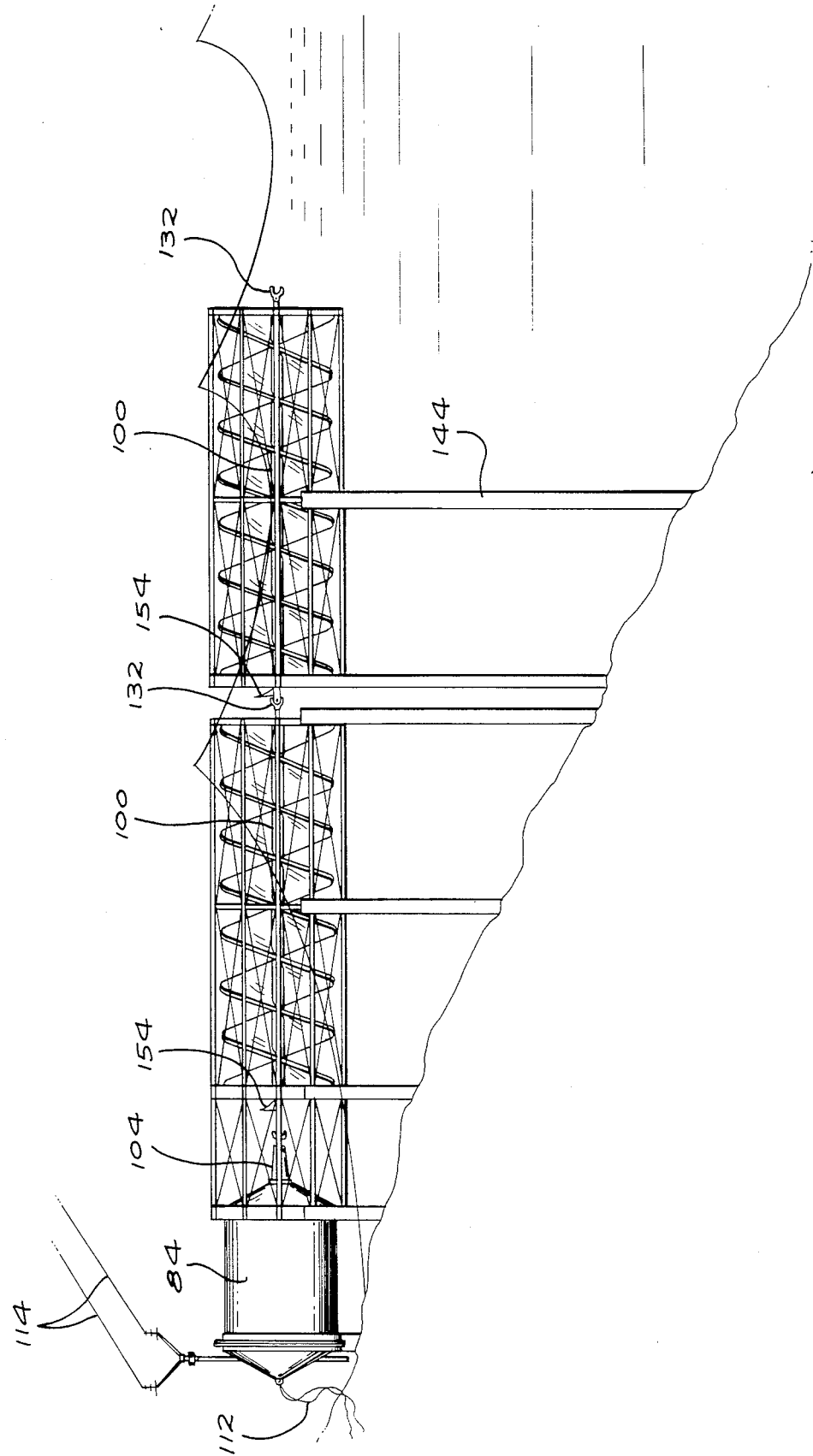

PORTABLE HYDROELECTRIC POWER UNIT

BACKGROUND OF THE INVENTION

This invention relates to hydroelectric assemblies and more particularly to apparatus driven by the force of a current of fluid such as water.

In view of the desire of individuals to conserve energy as well as to be able to travel to remote areas where power is not readily available, there exists a need for an energy generating device which is inexpensive to manufacture, effective to use, and easy to move from locale to locale.

There also exists a need for an energy generating device that will produce a maximum amount of energy when placed in a body of water having a relatively slow current.

The present invention responds to these needs and may be constructed in such sizes as to accommodate home or commercial requirements.

SUMMARY OF THE INVENTION

The present invention is comprised of a blade spiraling about a longitudinal axis and angling away therefrom, the blade being rotatably mounted to a generator such that the rotational motion of the blade is communicated to the generator and converted into electricity. The blade may be mounted on a shaft or spindle and may be comprised of a plurality of longitudinally spaced blades.

BRIEF DESCRIPTION OF THE DRAWINGS

FIG. 3 is a perspective view of a third embodiment of the power unit of the present invention, the entire power unit in this third embodiment being contained in a closed housing.

FIG. 4 is a side view taken partially in section of the power unit shown in FIG. 3.

FIG. 5 is an end generator view of the power unit of FIG. 3.

FIG. 6 is an end blade view of the power unit of FIG. 3.

FIG. 7 is a partial sectional view of a fourth embodiment of the power unit of the subject invention disclosing an alternative generator-shaft connection and gearing arrangement.

FIG. 8 is a perspective view of a fifth embodiment of the power unit of the invention, a part of the power unit being contained in an open housing varying from that shown in FIG. 2.

FIG. 9 is an end blade view of the power unit shown in FIG. 8.

FIG. 10 is an end generator view of the power unit shown in FIG. 8.

FIG. 11 is a sectional view of a sixth embodiment of the power unit of the subject invention and discloses a generator-shaft connection varying from that shown in prior figures.

FIG. 12 is a top sectional view of the power unit shown in FIG. 11 taken along line 12—12.

FIG. 13 is a partially diagrammatic view of the power unit of FIG. 11 taken along line 13—13 of FIG. 11.

FIG. 14 is taken along line 14—14 of FIG. 11

FIG. 15 is a power unit of the invention positioned at the water surface with two propeller housings.

DETAILED DESCRIPTION OF THE PREFERRED EMBODIMENTS OF THE INVENTION

Figure 1:
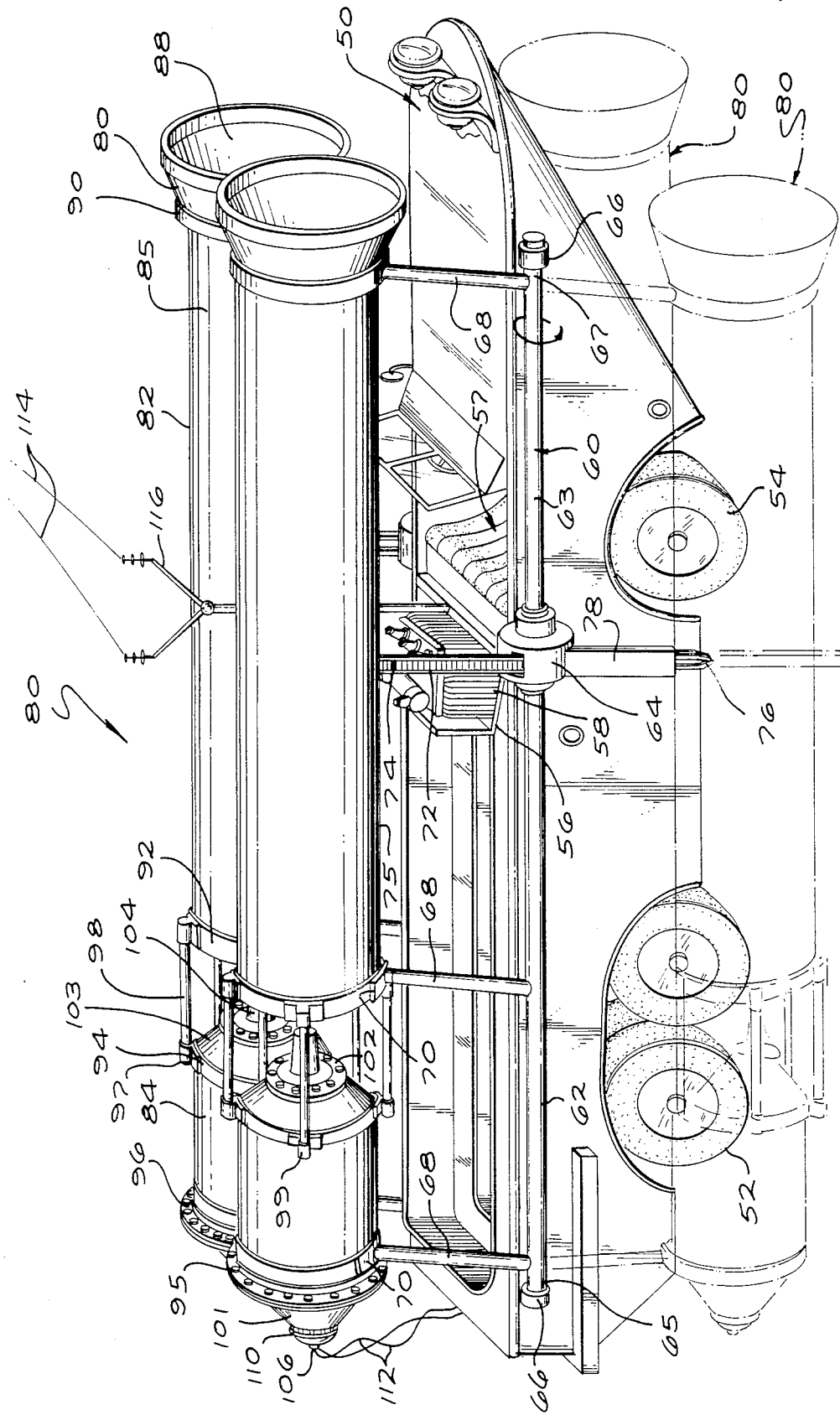
FIG. 1 is a perspective view of an amphibious vehicle transporting two power units of a first embodiment of the present invention, the power units being contained in closed housings.

FIG. 1 illustrates the first embodiment of the invention. Therein can be seen a support vehicle designated generally at 50. The support vehicle 50 includes rear wheels 52 located toward the rear of the support vehicle and front wheels 54 located toward the front of the vehicle. The vehicle also includes a containment section 56 which is located behind a front seat 57 in FIG. 1 and which serves to hold an energy conversion device 58 which is connected to the power units of the present invention. Mounted on the support vehicle 50 is a support frame generally designated by arrow 60. The support frame 60 includes a first rod 62 connected to a second rod 63 by means of a gearing and connecting mechanism 64. Rods 62 and 63 may be manufactured to be one long rod passing through gearing and connecting mechanism 64. Rods 62 and 63 are in any event rotatably supported within gearing and connecting mechanism 64.

Rod 62 is capped at its rear end 65 opposite the gearing and connecting mechanism 64 with an end cap 66. Rod 63 has a similar end cap 66 at front end 67 opposite the gearing and connecting mechanism 64. End caps 66 may be connected to the rear brake and front lights of the support vehicle 50 or may include illuminating glass so that other drivers will recognize the presence of the support frame 60. Support frame 60 also consists of three support struts 68 which extend generally perpendicular of longitudinal rods 62 and 63 and which are connected thereto. At the ends of support struts 68 are support brackets 70 which are generally curved in shape and are used to support and hold a power unit generally designated at 80, which may be carried by the support vehicle 50. Two of the support struts 68 are located generally adjacent rear end 65 and front end 67 of the support frame 60. The third support strut 68 is located intermediate the gearing and connecting mechanism 64 and rear end cap 66 attached to rod 62. In addition to the support struts 68, the support frame also includes lowering rod 72 which passes through and interacts with the gearing and connecting mechanism 64. Lowering rod 72 is generally parallel of the support rods 68 and defines along its length a plurality of ridges 74 which interact with engagement means (not shown) within the gearing and connecting mechanism 64 so that lowering rod 72 may be rigidly held in different longitudinal positions with respect to the support frame 60. Lowering rod 72 has a top brace 75 to support a power unit and a pointed end 76 opposite the top brace 75 for being embedded in the ground. A sleeve member 78 partially surrounds lowering rod 72 near pointed end 76 and connects to the gearing and connecting mechanism 64. As shown by the dotted lines and curved arrow in FIG. 1, the support frame 60 may be lowered with respect to the support vehicle 50 by moving lowering rod 72 downwardly and away from its abutment with the power unit 80 and rotating longitudinal rods 62 and 63 and support struts 68 away from support vehicle 50 and toward the ground. This action enables the placement on or removal from support brackets 70 of a power unit 80. Support frame 60 may be powered independently of support vehicle 50 or connected for movement to the battery or power system of support vehicle 50 for easy automatic operation by the driver.

Two power units 80 are shown in FIG. 1. Each power unit is comprised of essentially two major parts, a blade housing 82 and a generator housing 84. The blade housing 82 is generally cylindrical in shape and of constant diameter. At end 85, blade housing 82 connects to a flared portion 86 by means of cylindrical collar 90. Flared portion 86 becomes of constant diameter at collar 88. Cylindrical collar 92 surrounds the opposite end of blade housing 82 and acts as a connection base for bars 98 which extend between and are parallel to blade housing 82 and generator housing 84. Blade housing 82 is supported by support bracket 70 at collars 90 and 92. Bars 98 are shown to include end caps 97 with rivets passing therethrough and connecting them to fastening plates 99, the blade housing 82, and generator housing 84.

Generator housing 84 is also substantially cylindrical in shape over most of its length and tapers at both its rear end 101 and its front end 103. The points at which the generator housing 84 begins to taper are defined by front cylindrical collar 94 and rear cylindrical collar 96.

Generator housing 84 and blade housing 82 are connected to each other by rods 98, as described above. Rear collar 96 is connected to rear end 101 by rims 95 which are bolted together. Rims 95 are of greater diameter than generator housing 84 and or collars of generator housing 84.

Rotatably mounted in generator housing 84 and blade housing 82 is blade shaft 100 which carries the blades housed in blade housing 82 and which connects to the gearing mechanisms and generator housed in generator housing 84. Connected to front end 103 of generator housing 84 is an end plate 102 which substantially closes end 103 of generator housing 84 and rotatably receives blade shaft 100 through conical sleeve 104. Rivets are shown securing end plate 102 to end 103 of generator housing 84. End plate 102 is connected to and substantially closes end 101 while connecting to sleeve 106 which receives wires 112. Wires 112 extend between energy conversion device 58 and the generator in generator housing 84. The generator is sealingly held within this housing so that the entire power unit may be placed in a body of water without damage to the generator. The power generated by the blades 126 and transmitted to the generator is carried by wires 112 through energy conversion device 58 to wires 114 which are held by electric transmitter pole 116. Electric transmitter pole 116 is carried by support vehicle 50 and is connected to energy conversion device 58.

Figure 2:
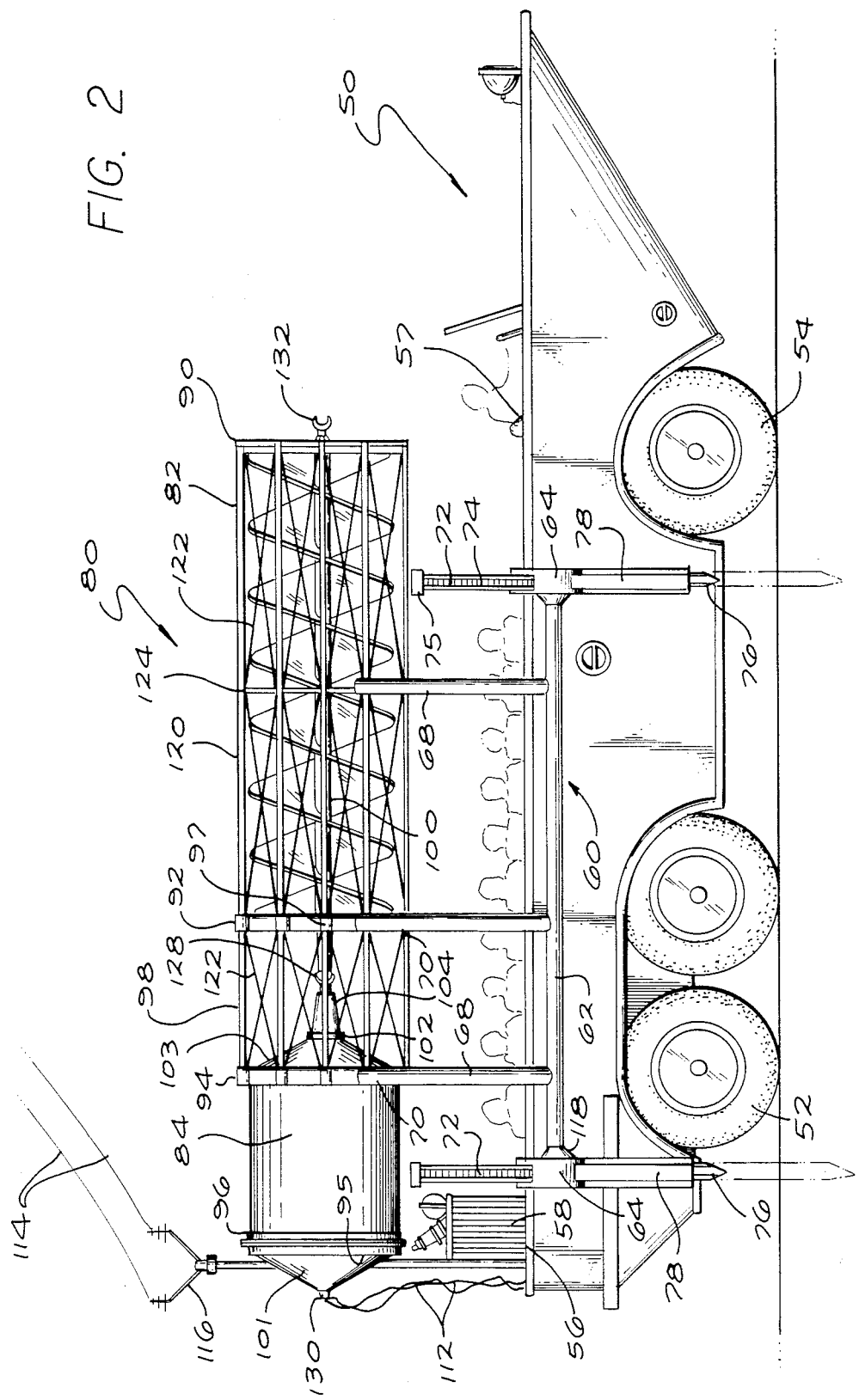
FIG. 2 is a side view of an amphibious vehicle transporting a second embodiment of the power unit, a part of the power unit being contained in an open housing.

FIG. 2 shows a second embodiment of the invention. Many of the elements described in FIG. 1 are also described in FIG. 2 and corresponding parts are numbered similarly. Shown in FIG. 2 is support vehicle 50 having rear wheels 52 and front wheels 54. Support vehicle 50 includes support frame 60 which is comprised of rod 62 which is rotatably connected at its two ends to gearing and connecting mechanisms 64 through sleeves 118. Extending perpendicularly of rod 62 are three support struts 68 supporting the power unit 80 with support brackets 70. Parallel to support struts 68 and extending through the two end gearing and connecting mechanisms 64 are adjustable lowering rods 72. Sleeves 78 partially surround lowering rods 72 and connect to gearing and connecting mechanism 64 such that only pointed ends 76 of lowering rods 72 are exposed below rod 62. In FIG. 2, the top braces 75 of lowering rods 72 are shown adjacent but not touching blade housing 82 and generator housing 84. As noted with respect to FIG. 1, lowering rods 72 may be locked into various positions by moving them within gearing and connecting mechanism 64.

In FIG. 2, blade housing 82 is shown to be an open housing connected to generator housing 84 by bars 98 which are connected between cylindrical collar 92 and cylindrical collar 94. The framework of blade housing 82 is generally cylindrical and consists of a number of struts or bars 120 which define its circumference. Struts 120 are joined to one another by diagonal supports 122, cylindrical collars 90 and 92, and by one body ridge 124 which is parallel to cylindrical collars 90 and 92. Diagonal-supports 122 also join bars 98. Body ridge 124 and cylindrical collars 92 and 94 are shown being supported by support struts 68. The hydraulic power unit 80 may be automatically lowered from the support vehicle 50 by lowering rods 72 through sleeve 78 away from the hydroelectric power unit 80 and then rotating rod 62 within gearing and connecting mechanisms 64 toward the ground. This action will bring power unit 80 to the ground level or lower enabling power unit 80 to be easily removed from or placed upon support bracket 70.

The open design of blade housing 82 in FIG. 2 makes evident the unique corkscrew construction of blade 126 as it is mounted on blade shaft 100. Blade shaft 100 attaches at one end to joint 128 which is attached to gears (not shown) held within generator housing 84. Joint 128 serves to transmit the rotational movement of blade shaft 100 to the gears housed in generator housing 84.

Generator housing 84 in FIG. 2 is similarly shaped to that shown in FIG. 1. However end 101 differs in that it directly receives wires 112 through mouth 130. Wires 112 are connected to energy conversion device 58 which is located in containment section 56. Containment section 56 is at the rear of support vehicle 50. The electric transmitter pole 116 and its attached wires 114 are also located at the rear of support vehicle 50 and connected to energy conversion device 58. The turning of blade shaft 100 is magnified and translated into energy in generator housing 84 which energy is transmitted through wires 112 into the energy conversion device 58 and out through wires 114.

At the end of blade shaft 100, opposite the generator housing 84 and extending beyond cylindrical collar 90 is attachment 132. Attachment 132 may be attached to a second blade 126 and blade shaft 100 such that several blade units may be connected in series to transmit their rotational movement into the mechanisms contained in generator housing 84.

FIG. 3 illustrates a third embodiment of the power unit 80 of the present invention. In this embodiment, the power unit is shown anchored to the ground through loops 134, chains 136 and anchoring pegs 138. In this embodiment, a closed housing is again shown for blade housing 82. Blade housing 82 is generally cylindrical along its length and connects to flared portion 86 through cylindrical collar 90. Cylindrical collar 90 lies between cylindrical collar 92 and cylindrical collar 88. All three collars are connected through plates 99 to loops 134. In FIG. 3, flared portion 86 is adapted to receive end 103 of generator housing 84 and is connected at collar 88 to collar 96 by bars 98. Bars 98 incline inwardly from collar 88 to collar 96 as the diameters of both blade housing 82 and flared portion 86 are greater than that of generator housing 84 and cylindrical collar 96. In FIG. 3, bars 98 are attached to loops 34 and plates 99 at collar 90. Generator housing 84 at end 101 has a bowl-like shape and attaches at its base to end plate 110. End plate 110 connects to fitting 144 which is securely attached to nipple 146 from which extends wire 112.

FIG. 4 is a cross-section of the power unit of FIG. 3 placed in a body of water. Illustrated therein is helical blade 126 mounted on blade shaft 100 which is concentric of blade housing 82. Helical blade 126 is a single blade extending along the length of the cylindrical portion of blade housing 82. Blade shaft 100 attaches to gears 148 and generator 150 through conical sleeve 104 and via joints and sealings known to one skilled in the art. Generator 150 and gears 148 are sealed into generator housing 84 to prevent their corrosion and damage by water surrounding power unit 80. Anchoring pegs 138 are shown in FIG. 4 and have a threaded lower body 137 which narrows to a point 139 and a cylindrical top 141 of greater diameter than lower body 137. Anchoring pegs 138 are quite substantial in size to securely anchor the power unit 80 to the ground.

FIG. 5 is an end view of the generator of FIG. 3 and FIG. 4 and illustrates loops 134, blade 126, blade shaft 100, and wire 116 emerging from nipple 146.

FIG. 6 is an end blade view FIG. 3 showing blade 126, loops 134, and blade shaft 100 as it is rotatably mounted at the center of cross-shaped supports 106. A similar means of rotatably mounting blade shaft 100 is used within cylindrical collar 90.

FIG. 7 illustrates in part a fourth embodiment of the invention wherein gear mechanisms 148 are of a different sort than that shown in FIG. 4 and where the joint 128 between blade shaft 100 and gears 148 is a universal joint 128. Because of the different gearing arrangement shown in this embodiment, end 103 includes tubular portion 130 for housing the gearing mechanisms. Blade 126 is a single blade spirally mounted on blade shaft 100.

FIG. 8 illustrates a fifth embodiment of the invention. Here the framework of blade housing 82 is rectangular in shape and open. It consists of four longitudinal rods 152 defining the edges of the rectangle. Rods 152 are connected by perpendicular crossrods 154 and a cross-shaped supports 106 at each end. Crossrods 154 divide the rectangular housing into a number of smaller rectangular sections which are provided with cross supports 122 for additional reinforcement.

Blade shaft 100 extends through the center of the blade housing 82 and is rotatably mounted at the center of the two cross-shaped supports 106. Blade 126 spirals about blade shaft 100 and extends the length of blade housing 82. In this embodiment, blade 126 has a particular angle of curvature, causing it to arc and angle away from blade shaft 100. Blade housing 82 is connected to generator housing 84 by bars 98. As the height and depth of blade housing 82 is greater than the diameter of generator housing 80, bars 98 taper toward generator housing 84. Bars 98 extend from each of the four corners of the blade housing 82 adjacent generator housing 84 and attach between cross rods 154 and cylindrical collar 94 of the generator housing 84, where they are bolted. They then bend parallel of generator housing 84 to connect to cylindrical collar 96 and extend slightly there past. At the ends of bars 98 near cylindrical collar 96, are openings 108 for connection to anchoring chains 136. The shape of the generator housing 84 in FIG. 8 is very similar to that disclosed in FIG. 3.

FIG. 9 is an end blade blade view of FIG. 8 showing cross-shaped support 106 and blade shaft 100 rotatably mounted at the center of cross-shaped support 106. The square end of the blade housing 82 is clearly depicted in this figure as well as blade 126 surrounded by blade housing 82.

FIG. 10 is a generator end view of FIG. 8 and shows bars 98 as they are attached through anchoring chains 136 to anchoring pegs 138. Nipple 146, end plate 110 and the square end of blade housing 82 as defined by cross rods 154 can also be seen as well as parts of cross-shaped support 106.

FIGS. 11 and 12 illustrate a sixth embodiment of the invention. In these figures, the blade housing 82 is closed and shown in cross-section as comprising an outer skin 164 and an inner skin 168 defining an annular opening therebetween. Extending between outer 164 and inner 168 skin are walls 170. Walls 170 may be severed or continuous divisions between the two skins and serve to pocket air held between inner skin 168 and outer skin 164 as well as assist in the support of blade housing 82. Blade housing 82 is preferably made of a plastic, fibergalss or a wood or metal laminated with plastic. But it can be made of other suitable materials. The purpose of this dual-skinned housing is to enable the device to float within the water such that it can situate itself more naturally in the ongoing currents to achieve the maximum benefit therefrom. Blade shaft 100 is centrally located within the blade housing 82 formed by inner skin 168 and outer skin 164 and contains at its end distant from the generator, attachment 132 for serially attaching to and turning with another blade shaft 100. Helical blade 126 extends along the length of the blade shaft 100 and throughout the length of inner skin 164.

Blade shaft 100 is attached through a multiple jointing 128 to the gears 148 in generator housing 84. As can be clearly seen from FIG. 11, this multiple-joint system enables the generator housing 84 to be placed above the blade housing 82 or at any desirable angle with respect to the blade housing 82 while the rotation of blade shaft 100 is communicated through joints 128 to the gears 148.

While FIG. 11 illustrates blade housing 82 designed for the receipt of generator housing 84 in opening 140, this is merely a matter of engineering and design choice. The body shape of blade housing 82 will be affected by materials used, bodies of water being considered and aesthetic design.

FIGS. 11 and 12 also depict substantially changed anchoring means 138. Anchoring means 138 are depicted as having an elongated smooth body which at one end comes to a point and at the other end contains a widened cap. The pointed end is to be placed in the ground. Preferably, three anchoring means are used and are located in an arcuate or triangular configuration about the generator end of blade housing 80 as is shown in FIG. 12. Stretching between anchoring means 138 is filter element 178. Stretching between the two outermost anchoring means and the end of the blade housing are slats 142. These slats 142 connect to the blade housing and widen from such connection to the anchoring means to form a funnel with the blade housing causing a greater amount of water to pass through the blade housing. Slats 142 are solid and are firmly attached to filter elements 178 but slidably attached to anchoring means 138 so that as the blade housing floats upwardly and downwardly in the currents so do the slats and filter elements. In this regard, blade housing 82 is shown in FIGS. 11 through 14 to have an unusual geometric shape. Outer skin 164 extends lengthwise beyond that of the inner skin 168. Inner skin 168 is joined to the outer skin by angled sides 180. This causes inner skin 168 to widen to join outer skin 164 and thus to make the opening to the blade housing 82 at its generator end also somewhat funnel-shaped which enhances the action of slats 142 in causing a greater water flow past the blades 126.

Chains 136 extend between anchoring means 138 and the blade housing 82 and are slidably attached to anchoring means 138.

In FIGS. 13 and 14, the unusual shape of outer skin 164 and inner skin 168 is more clearly depicted. Inner skin 168 is shown to be generally u-shaped while outer skin 164 varies from being completely rectangular in cross section in the vicinity of opening 140 in the area between opening 140 and attachment 132, becomes partially rectangular at 142 narrowing toward the inner skin 164 at 144. The shape of the inner and outer skins are a matter of engineering and design choice. Cross supports 106 are also visible in these figures.

FIG. 15 is a power unit of the invention positioned at the water surface rather than under the water as shown in previous embodiments. When positioned in this fashion, incoming waves impinge upon the blades and cause them to rotate. In FIG. 15, use is made of attachment 132 to add an additional blade housing 82. Also shown in this figure is adjustment mechanism 154 which is used to adjust the angle and curvature of the blades with respect to shaft 100. Supports 144 are used to support the power unit in its surface orientation.

In use, the blade housing is placed in a body of water. Currents passing therethrough impinge upon blades 126 causing them and blade shaft 100 to rotate. This rotation is communicated to the gears held in the generator housing where it is magnified and converted into energy which is carried out through wire 112.

While the embodiments illustrated herein are suggestive of the present invention, they are not intended to be a limitation to it. The present invention may be constructed of plastics or any other suitable material or combination of materials. Further, while the embodiments shown herein illustrate a singular corkscrew blade spiraling about a shaft, the present invention also contemplates a plurality of blades spaced along the length of blade rod 100 and disconnected from one another. It also contemplates blades extending perpendicular of the rod or at various angles therefrom and having various curvatures as are needed to best respond to the water currents. The invention also contemplates the use of filter elements at the openings of the blade housing to prevent debris from entering the vicinity of the blades which may hinder blade rotation in response to currents. It also contemplates an adjustment mechanism connected to the blades for varying blade angle and/or curvature with respect to the blade shaft.

What is claimed is:

1. A hydroelectric power unit comprised of:
   a blade spiraling about a major axis and angling away therefrom, said blade having a first end along said axis and a second end opposite said first end;
   a shaft extending along said major axis and connected to said blade;
   at least one universal joint connected to said shaft;
   gears associated with said universal joint for magnifying the rotational movement of said shaft; and
   a generator, such that rotation of said blade is communicated to said shaft which causes rotation of said universal joint and gears which rotation is then communicated to said generator and converted to usable energy.

2. The hydroelectric power unit of claim 1 further including a water-tight housing surrounding said generator and said gears.

3. The hydroelectric power unit of claim 2 further including a housing surrounding said blade, said housing including mounting means for rotatably mounting said shaft.

4. The hydroelectric power unit of claim 3 wherein said housing surrounding said shaft is attached to said water-proof housing and is generally cylindrical in shape from said first end of said blade to said second end of said blade and then widens gradually.

5. The hydroelectric power unit of claim 4 wherein said portion of the shaft housing which widens gradually houses a portion of said water-tight housing and attaches thereto.

6. The hydroelectric power unit of claim 3 wherein said housing is a framework of intersecting bars and is cylindrical in shape and attaches to said water-proof housing.

7. The hydroelectric power unit of claim 3 wherein said housing is a framework of intersecting bars and is rectangular in shape and attaches to said water-proof housing.

8. The hydroelectric power unit of claim 3 further including filter means about at least a portion of said housing to keep debris from entering said housing and preventing the rotation of said blade.

9. The hydroelectric power unit of claim 3 wherein said housing is comprised of an inner skin, an outer skin, and walls, said inner skin and said outer skin defining a sealed air opening therebetween, said walls acting to pocket said air and support said skins such that said housing can float in water.

10. The hydroelectric power unit of claim 9 wherein said inner skin tapers toward said outer skin at least one end of said blade causing the opening of said housing to said blade to be widened thereby enabling a greater flow of current through said housing.

11. The hydroelectric power unit of claim 10 further including anchoring means connected to an end of said housing;
   filter means located between said anchoring means and slidably connected thereto, said filter means acting to keep debris from entering said inner skin;
   and slats connected between said inner skin and said anchoring means, said slats being slidably attached to said anchoring means and solidly attached at at least one point of said filter means, said anchoring means being placed at a distance from said housing end and situated to be wider than said housing end such that said slats are connected to said anchoring means to define a funnel between said anchoring means and said inner skin so that a greater amount of water passes through said inner skin, said slidable connection of said slats and said filter means with said anchoring means enabling at least said housing, said slats and said filter means to float upwardly and downwardly on said anchoring means.

12. The hydroelectric power unit of claim 3 further including anchoring means, said anchoring means being attachable to said water-proof housing and said blade housing for anchoring said housing in place.

13. The hydroelectric power unit of claim 3 further including support means, said support means being attachable to a vehicle and being comprised of:
- a first bar having two opposing ends capable of illumination;
- at least two bars perpendicular to said first bar and near said two opposing ends capable of illumination, said perpendicular bars containing means for holding said waterproof housing and said housing surrounding said blade;
- at least one rotational support means for holding and rotating said first bar; and
- lowering means slidingly received and fixedly held in said rotational support means and parallel of said perpendicular bars, said lowering means including a support and a pointed end, said support end being capable of support said waterproof housing and said blade housing, said pointed end being capable of being planted in the ground,
- said support means being connectable to the side of a vehicle such that said first rod is parallel to the major axis of said vehicle and said perpendicular bars and said lowering means are used to support a waterproof housing and a blade housing, and upon lowering of said lowering means from said housing, said first rod may be rotated away from said vehicle to facilitate the removal of said waterproof and blade housing.

14. The hydroelectric power unit of claim 6 wherein said blade is made of plastic and said housing is made of plastic.

15. The hydroelectric power unit of claim 6 wherein said blade arcs and angles away from said shaft.

16. The hydroelectric power unit of claim 12 including adjustment means for adjusting the arc and angle of said blade with respect to said shaft.

17. The hydroelectric power unit of claim 6 including adjustment means for adjusting the angle of said blades with respect to said shaft.

18. A hydroelectric power unit comprised of:
- a blade spiraling about a major axis and angling away therefrom, said blade having a first end along said axis and a second end opposite said first end;
- a shaft extending along said major axis and connected to said blade;
- a generator, said blade being rotatably mounted to said generator such that rotation of said blade is communicated to said generator and converted into electricity; and
- attachment means at the end of said shaft opposite said generator, said attachment means being operable to connect said shaft in series to a second shaft having at least one blade thereon so that the rotational movement of said second shaft and the rotational movement of said first shaft are both communicated to said generator.

19. A hydroelectric power unit comprised of:
- a blade spiraling about a major axis and angling away therefrom, said blade having a first end along said axis and a second end opposite said first end;
- a shaft extending along said major axis and connected to said blade, wherein said blade arcs and angles away from said shaft;
- a generator, such that rotation of said blade causes rotation of said shaft which is communicated to said generator and converted to usable energy; and
- an adjustment means for adjusting the angle of said blade with respect to said shaft.

* * * * *